(12) United States Patent
Karunaratne et al.

(10) Patent No.: US 11,834,023 B2
(45) Date of Patent: Dec. 5, 2023

(54) CONTROL SYSTEM (71) Applicant: Transportation IP Holdings, LLC, Norwalk, CT (US)

(72) Inventors: Milan Karunaratne, Orange, CA (US); Nathan Thomas North, Seattle, WA (US); Anthony D. Paul, Anchorage, AK (US)

(73) Assignee: Transportation IP Holdings, LLC, Norwalk, CT (US)

( * ) Notice: Subject to any disclaimer, the term of this patent is extended or adjusted under 35 U.S.C. 154(b) by 292 days.

(21) Appl. No.: 17/237,686

(22) Filed: Apr. 22, 2021

(65) Prior Publication Data
US 2022/0340119 A1 Oct. 27, 2022

(51) Int. Cl.
*B60T 17/22* (2006.01)
*G07C 5/00* (2006.01)
*G07C 5/02* (2006.01)

(52) U.S. Cl.
CPC .......... *B60T 17/221* (2013.01); *B60T 17/228* (2013.01); *G07C 5/008* (2013.01); *G07C 5/02* (2013.01)

(58) Field of Classification Search
CPC ..... B60T 17/221; B60T 17/228; G07C 5/008; G07C 5/02
See application file for complete search history.

(56) References Cited

U.S. PATENT DOCUMENTS

| 4,317,988 | A | 3/1982 | Wilson |
| 8,626,371 | B2 | 1/2014 | Kumar et al. |
| 9,145,145 | B2 | 9/2015 | Kumar et al. |
| 9,233,696 | B2 | 1/2016 | Kumar et al. |
| 10,233,920 | B2 | 3/2019 | Worden et al. |
| 10,540,892 | B1 | 1/2020 | Fields et al. |
| 2013/0151133 | A1* | 6/2013 | Kickbusch ............. B61L 27/16 701/117 |
| 2016/0046308 | A1* | 2/2016 | Chung ................ B61L 15/0027 701/20 |
| 2018/0257683 | A1 | 9/2018 | Govindappa et al. |
| 2019/0176862 | A1 | 6/2019 | Kumar et al. |
| 2019/0193759 | A1* | 6/2019 | Ravi ................... B61L 15/0081 |
| 2020/0189630 | A1* | 6/2020 | Kernwein ........... B61L 15/0054 |
| 2020/0380795 | A1* | 12/2020 | Melen .................... G07C 5/008 |

(Continued)

OTHER PUBLICATIONS

Extended European Search Report for related European Patent Application No. 22164089.9 dated Sep. 8, 2022 (8 pages).

(Continued)

*Primary Examiner* — James J Lee
*Assistant Examiner* — Steven Vu Nguyen
(74) *Attorney, Agent, or Firm* — THE SMALL PATENT LAW GROUP LLC; Mary D. Lawlor (57) ABSTRACT

A control system is provided that may include a controller for a vehicle system. The controller may include one or more processors configured to obtain at least one first operating parameter related to an operating system of the vehicle system, and determine an operating condition of the operating system based at least in part on the first operating parameter. The one or more processors may also be configured to communicate with an off-board sensor to obtain at least one auxiliary operating parameter related to the operating condition, and verify the operating condition based at least in part on the auxiliary operating parameter.

20 Claims, 2 Drawing Sheets

(56) References Cited

U.S. PATENT DOCUMENTS

2021/0006628 A1* 1/2021 Pai ................... H04L 43/16
2022/0266883 A1* 8/2022 Tripathy ............ B61L 15/0081

OTHER PUBLICATIONS

Accident Investigation Report HQ-2016-1126 issued by the Federal Railroad Administration Office of Railroad Safety Accident and Analysis Branch, CSX Transportation (CSX), Washington, DC, May 1, 2016 (14 pages) <https://railroads.dot.gov/sites/fra.dot.gov/files/fra_net/17442/HQ-2016-1126%20Final-Sept.21.pdf>.

Vantuono, "UPDATE: CP grain train derailment claims three lives", Railway Age, Feb. 4, 2019, (6 pages). <https://www.railwayage.com/news/cp-grain-train-derailment-claims-three/#>.

Thomas, "Brake Defects Plague Canada's Aging Grain Cars", Railway Age, May 15, 2020, (3 pages). <https://www.railwayage.com/safety/brake-defects-plague-canadas-aging-grain-cars/>.

Gilbert et al., "Brake-Related Failures Dog Freight Railroads", Wall Street Journal, Jul. 16, 2013, (4 pages). <https://www.wsj.com/articles/SB10001424127887323664204578610191409256034>.

Jamieson et al., "Automated Train Air Brake Effectiveness Test Process at Canadian Pacific", Canadian Pacific, 2013 (8 pages).

First Examination Report for corresponding AU Application No. 2022201550 dated Jun. 27, 2023 (3 pages).

Examination Report No. 2 for corresponding AU Application No. 2022201550 dated Oct. 20, 2023 (3 pages).

\* cited by examiner

200# CONTROL SYSTEM

BACKGROUND

Technical Field

The subject matter described relates to control systems and methods that monitor or inspect vehicles for diagnosing maintenance.

Discussion of Art

Vehicles that are part of a fleet, or operate to carry cargo or passengers typically run on a schedule. Often such vehicles have locations such as ports, rail stations, airports, depots, etc. where the vehicles stop for fueling, maintenance, loading and unloading passengers or cargo, etc. One of the main areas of delay for such vehicles comes from maintenance of the vehicle. Specifically, when in route, inspection of a vehicle simply does not occur. When a vehicle finally does stop, while inspections may be made by individuals, often errors can occur. In addition, such inspections are time consuming, and if an inspection unveils maintenance is required, further delay can occur.

For example, for rail vehicles, mandated air brake tests are mostly visual, manually done, and fairly subjective. Such inspection is based on adding and removing air pressure from the rail vehicle line, and then inspecting bleed down and visual characteristics. Also, valve positioning and critical connections are visually completed. Weather conditions such as extreme cold make it difficult to do these inspections with the necessary accuracy and precision in the elements. Still, the inspection is safety critical if not performed reliably, accurately, and consistently. In addition, such an inspection does not even reflect the effectiveness of the brake (e.g. force of pad on the wheel). Such lengthy diagnosis and troubleshooting process of walking the rail vehicle causes delays. In particular, approximately 30% of rail vehicle delays are as a result of leaky air in an air brake.

Existing solutions for improving maintenance rely heavy on manual processes inspections in the locations, such as a rail vehicle yard, where the vehicle stops. Once the vehicle leaves the area after being inspected it is assumed to be operating properly until that vehicle is inspected again. Such processes still continue to be plagued with human error, and unforeseen maintenance delays.

BRIEF DESCRIPTION

In one or more embodiments, a control system is provided that may include a controller for a vehicle system. The controller may include one or more processors configured to obtain at least one first operating parameter related to an operating system of the vehicle system, and determine an operating condition of the operating system based at least in part on the first operating parameter. The one or more processors may also be configured to communicate with an off-board sensor to obtain at least one auxiliary operating parameter related to the operating condition, and verify the operating condition based at least in part on the auxiliary operating parameter.

In one or more embodiment, a method is provided that may include obtaining, with a sensor, at least one first operating parameter related to an operating system of the vehicle. The method may also include comparing the at least one first operating parameter to an expected first operating parameter, and communicating to an off-board sensor to detect at least one auxiliary operating parameter related to the operating system in response to the at least one first operating parameter exceeding a determined threshold value related to the expected first operating parameter. The method may also include determining an operating condition related to the first operating parameter based on the auxiliary operating parameter.

In one or more embodiments, a control system is provided that may include a controller for a vehicle system. The controller may include one or more processors configured to obtain at least one first operating parameter related to an operating system of the vehicle system. The one or more processors may also be configured to communicate to an off-board sensor to detect at least one auxiliary operating parameter related to the operating system based on the at least one first operating parameter, and determine an operating condition based on the at least one auxiliary operating parameter. The one or more processors may also be configured to communicate with an off-board controller at a remote location based on the operating condition.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a control system that monitors, or inspects, numerous operating systems of a vehicle. The control system may utilize sensors, or otherwise, to obtain operating parameters related to each operating system during a trip. A determination can then be made based on an expected operating parameter whether an operating system is performing adequately, or if potential maintenance may be needed. In particular, based on data related to a trip plan, expected temperatures, pressures, fluid levels, etc. may be determined for any given time or distance of the trip. Then, an obtained operating parameter may be compared to the expected operating parameter, and if a determined threshold value is exceeded, an operating condition may be presented that indicates a malfunctioning operating system could be presented. To verify the operating condition that indicates the malfunctioning operating system, the control system communicates with an off-board sensor to obtain an auxiliary operating parameter that may be used to determine, and/or verify the operating condition. Such auxiliary operating parameter may then be communicated to the control system for such determination and verification. In this manner, a diagnosis of the operating condition may be made as the vehicle is traveling along a route and communicated to a remote off-board controller such as a depot controller or maintenance controller. The control system may also determine remedial actions accordingly. In this manner, maintenance may be scheduled before the vehicle even reaches a next stop, speeding maintenance cycle time. Additionally, such diagnosis may be provided to an inspector, such that extra care may be undertaken by the inspector, preventing human error.

Not all embodiments described herein are limited to rail vehicles. For example, one or more embodiments of the control systems and methods described herein can be used in connection with other types of vehicles, such as automobiles, trucks, buses, mining vehicles, marine vessels, aircraft, agricultural vehicles, or the like.

Figure 1:
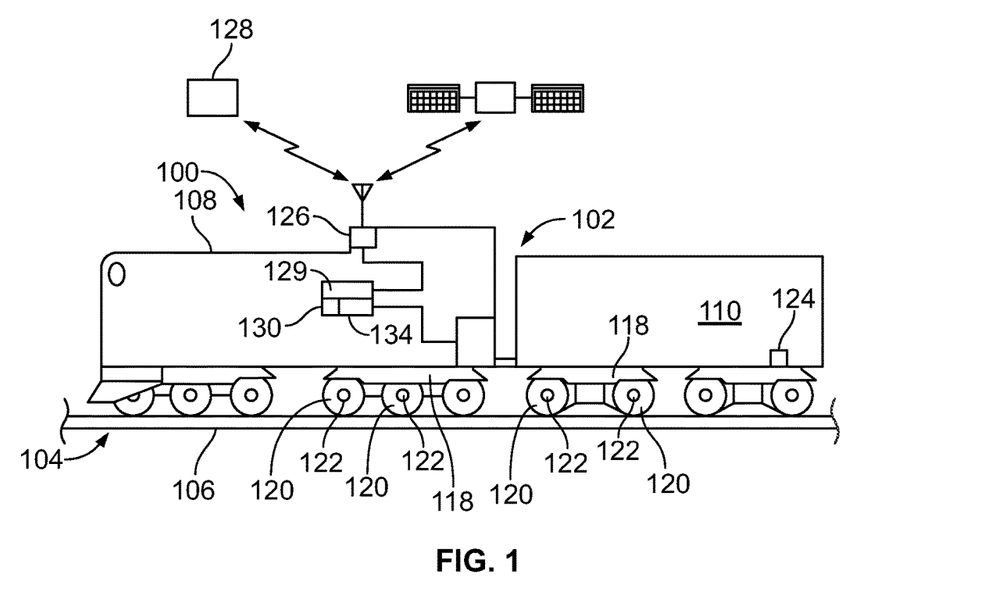
FIG. 1 illustrates a block schematic diagram of a vehicle.

FIG. 1 illustrates a schematic diagram of one example of a vehicle system 100 that includes a control system 102. The control system monitors/inspects operating systems of the vehicle system to diagnose and identify operating conditions that require maintenance, repair, replacement, or the like. The vehicle system may be configured to travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle system and optionally, one or more non-propulsion-generating vehicles. Alternatively, the vehicle system may be formed of only a single propulsion-generating vehicle.

The propulsion-generating vehicle may generate tractive efforts to propel (for example, pull or push) the vehicle system along routes. The propulsion-generating vehicle includes a propulsion subsystem, such as an engine, one or more traction motors, and/or the like, that operate to generate tractive effort to propel the vehicle system. The propulsion-generating vehicle also includes a braking system 112 that generates braking effort to slow or stop movement of the vehicle system. Although one propulsion-generating vehicle and one non-propulsion-generating vehicle are shown in FIG. 1, the vehicle system may include multiple propulsion-generating vehicles and/or multiple non-propulsion-generating vehicles. In an alternative embodiment, the vehicle system only includes the propulsion-generating vehicle such that the propulsion-generating vehicle is not coupled to the non-propulsion-generating vehicle or another kind of vehicle. In yet another embodiment, the vehicles are logically or virtually coupled together, but not mechanically coupled together.

In the example of FIG. 1, the vehicles each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. In one embodiment, the vehicle system may not include axles, such as in some mining vehicles, electric vehicles, etc. The wheels may also include an on-board sensor 124 associated therewith. Such an on-board sensor may be an air pressure sensor related to a braking system, a speed sensor related to the axle, a temperature sensor related to the axle, or the like.

The control system may further include a wireless communication system 126 that allows wireless communications between vehicles in the vehicle system and/or with remote locations, such as the remote (e.g., dispatch) location 128. The communication system may include a receiver and a transmitter, or a transceiver that performs both receiving and transmitting functions. The communication system may also include an antenna and associated circuitry.

The control system may also include a controller 129 that includes a trip characterization element 130. The trip characterization element may be configured to provide data about the trip of the vehicle system along the route. The trip information may include route characteristics, designated locations, designated stopping locations, schedule times, meet-up events, directions along the route, and the like. For example, the designated route characteristics may include grade, elevation slow warnings, environmental conditions (e.g., rain and snow), and curvature information. The trip information concerning schedule times may include departure times and arrival times for the overall trip, times for reaching designated locations, and/or arrival times, break times (e.g., the time that the vehicle system may be stopped), and departure times at various designated stopping locations during the trip.

The trip characterization element may also include vehicle control setting for the trip, including throttle settings, dynamic braking settings, etc. The trip characterization element may be a database stored in an electronic storage device, or memory. The information in the trip characterization element 130 may be input via the user interface device by an operator, may be automatically uploaded, or may be received remotely via the communication system. The source for at least some of the information in the trip characterization element may be a trip manifest, a log, or the like.

In an embodiment, the controller may include a vehicle characterization element 134. The vehicle characterization element may provide data about the make-up of the vehicle system, such as the type of non-propulsion-generating vehicles (for example, the manufacturer, the product number, the materials, etc.), the number of non-propulsion-generating vehicles, the weight of non-propulsion-generating vehicles, whether the non-propulsion-generating vehicles are consistent (meaning relatively identical in weight and distribution throughout the length of the vehicle system) or inconsistent, the type and weight of cargo, the total weight of the vehicle system, the number of propulsion-generating vehicles, the position and arrangement of propulsion-generating vehicles relative to the non-propulsion-generating vehicles, the type of propulsion-generating vehicles (including the manufacturer, the product number, power output capabilities, available notch settings, fuel usage rates, etc.), and the like.

The vehicle characterization element may be a database stored in an electronic storage device, or memory. The information in the vehicle characterization element may be input using an input/output (I/O) device (referred to as a user interface device) by an operator, may be automatically uploaded, or may be received remotely via the communication system. The source for at least some of the information in the vehicle characterization element may be a vehicle manifest, a log, or the like.

The controller in one example may be part of monitoring or inspection functionality of the control system As such, the controller may also be in communication with an on-board sensor 136. The on-board sensor detects a first operating parameter associated or related to an operating system of the vehicle system. The operating system may include a braking system, propulsion system, wheel bearing system, communication system, heating system, cooling system etc. Each operating system functions and operates to control the movement and operation of the vehicle. The first operating parameter may include temperatures, pressures, forces, speeds, rotational speeds, velocities, accelerations, temperature increases, decreases, and changes, pressure increases, decreases, and changes, or the like. In one example, the on-board sensor detects the pressure in an air feed system of the braking system. In another example, the on-board sensor may be a temperature sensor that detects the temperature of the grease in a bearing case. Alternatively, on-board sensor may be a float that detects the oil level in a bearing case. In yet another example, the on-board sensor may be a sensor that detects the rotational speed of a drive shaft.

In each example, the on-board sensor detects a first operating parameter that may be utilized to determine if an operating condition present. For example, the pressure in the air feed system, including changes in pressure may be used to determine the potential for faulty brakes. The temperature of the grease in a bearing case, or the oil level in the bearing case may be indicative of a hot axle. Meanwhile, the rotational speed of the drive shaft may be indicative of an overheating or malfunctioning engine. Such determinations may be made by processors executing one or more instructions by using algorithms, mathematical functions, mathematical models, look up tables, decision trees, or the like.

The controller may also be in communication with an off-board sensor 138 as part of the monitoring or inspection system functionality of the control system. The off-board sensor may be a wayside device, a mobile sensor platform such as a drone or robot, a sensor on another vehicle or vehicle system, or the like.

The off-board sensor may be located adjacent to the route. Specifically, the off-board sensor may be considered adjacent to the route when placed in a position where the off-board sensor can obtain and detect operating parameters related to the vehicle on the route. For example, in an example when the off-board sensor is a camera, the camera may be adjacent to the route when the field of view of the camera captures one of the route or the vehicle system on the route. Similarly, in an example when the sensor is an infrared camera, or a hot box sensor that can determine the temperature of a component of an operating system, the sensor may be adjacent the route when such detection of the vehicle can be accomplished. To this end, the off-board sensor may be a video camera, infrared sensor, acoustic sensor temperature sensor, accelerometer, vibration sensor, motion sensor, hot box detector, vehicle identification scanner, lidar device, pressure sensor, or the like.

Figure 2:
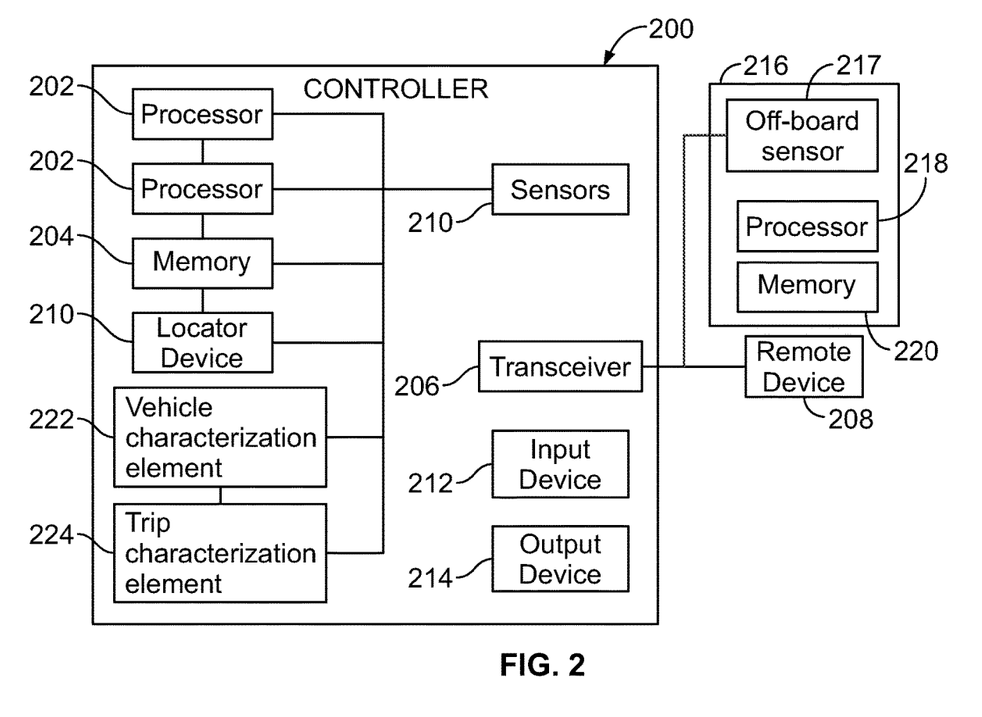
FIG. 2 illustrates a schematic view of a control system within an area.

FIG. 2 provides a schematic illustration of a controller 200 that may be configured to control operation of a vehicle system. In one example, the controller represents the controller in FIG. 1, and operates the control system of FIG. 1. The controller may be a device that includes one or more processors 202 (microprocessors, integrated circuits, field programmable gate arrays, etc.). The one or more processors may determine characteristics of the vehicle based on a sensor reading, and/or based on one or more operating parameters.

The controller optionally may also include a controller memory 204, which may be an electronic, computer-readable storage device or medium. The controller memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The memory may be utilized to store information related to vehicle parameters, route parameters, trip parameters, operating parameters, or the like. Vehicle parameters may include vehicle weight, wheel diameter, tachometer readings, throttle settings, brake settings, speeds, brake settings, accelerations, etc. Route parameters may include route grade, route weather, route curvature, etc. Trip parameters may include destination, speed limits for areas, traffic congestion, break locations, tunnel locations, or the like. Operating parameters may include operating system temperatures, operation system pressure levels, operating system force determinations, operating system wear determinations, etc. The memory may also be utilized to store information related to a trip plan, expected operating parameters based on the trip plan, expected operating parameters based on force determinations, etc. A trip plan may be considered a determined plan for the vehicle over the course of a trip to meet one or more objectives. Objectives may include being on-time, average traveling speed, total carbon emissions, or the like. Such trip plans may include those developed utilizing software such as a trip optimizer that can use vehicle characteristics and route characteristics to determine how to meet the one or more objectives.

The controller may also include a transceiver 206 configured to communicate with remote devices 208. The transceiver may be a single unit or be a separate receiver and transmitter. In one example, the transceiver may only transmit signals. The transceiver may use over the air communication, over a wire communication, wireless communication, communication protocols, etc.

The controller may also include one or more on-board sensors 210 coupled to the vehicle to detect vehicle parameters, route parameters, trip parameters, operating parameters of operating systems, or the like. The sensors may be coupled to the vehicle, on an operating system, adjacent an operating system, within an operating system, or otherwise. For example, an on-board sensor may be a camera, infrared sensor, temperature sensor, vibration sensor, motion sensor, pressure sensor, float sensor, fluid level sensor, or the like. Specifically, the on-board sensor may include any on-board sensor described in relation to FIG. 1. Each sensor may be able to detect parameters, including first operating parameters for use in determinations related to operating conditions by the one or more processors.

The controller may also include an input device 212 and an output device 214. Specifically, the input device may be an interface between an operator and the one or more processors. The input device may include a display or touch screen, input buttons, ports for receiving memory devices, etc. In this manner, an operator may manually provide parameters into the controller, including vehicle parameters, route parameters, and trip parameters.

The output device may present information and data to an operator, or provide prompts for information and data. The output device may similarly be a display or touch screen. In this manner, a display or touch screen may be an input device and an output device. In one example, the controller may communicate one or more remedial actions to the operator related to an operating condition determined and verified by the one or more processors. Such remedial actions may include a reduction of speed of the vehicle, stopping the vehicle, scheduling maintenance, contacting a remote location or off-board controller, scheduling a follow up inspection from another off-board sensor or device, or the like. In one example, plural remedial actions may be communicated. In another example, the controller may automatically undertake remedial actions such as slowing the vehicle, stopping the vehicle, scheduling maintenance, etc. and communicate to the operator that the remedial action may be being undertaken and/or provide information regarding why the remedial action may be being undertaken. In yet another example, numerous remote sensors, or monitoring device may be located along a route, such that the remedial action is to determine a remote sensor or monitoring device that may have an increased reading accuracy based on the operating parameter being monitored. To this end, an initial remote sensor may provide an inconclusive result, such that instead of just indicating the result is inconclusive, a next remote sensor that can measure the same operational parameter may be utilized to verify a condition determined on-board the vehicle.

The controller may also be in communication with an off-board controller. The off-board controller 216 may be server, remote off-board device, back office controller, vehicle dispatch controller, maintenance controller, depot controller, or the like. In one example, the off-board controller may be a positive vehicle control (PVC) system, and more specifically, in one embodiment a positive train control (PTC) system. The PVC system may be configured to receive characteristic information from the transceiver, determine and/or calculate the characteristic of a vehicle, calculate characteristics and parameters of the vehicle, restrict movement of the vehicle and one or more other vehicles based on a set of rules, etc.

A PVC system is a monitoring system utilized by a vehicle system to allow the vehicle system to move within a designated restricted manner (such as above a designated penalty speed limit, to enter another route segment, etc.) only responsive to receipt or continued receipt of one or more signals (e.g., received from off-board the vehicle) that meet designated criteria, e.g., the signals have designated characteristics (e.g., a designated waveform and/or content), are received at designated times (or according to other designated time criteria), and/or under designated conditions. For example, the vehicle may be automatically prevented from entering into another route segment unless a signal may be received by the PVC system indicating that the other route segment does not include any other vehicles, may be automatically prevented from moving at speeds above a speed limit when a route segment has a maintenance crew present, etc. This may be opposed to 'negative' vehicle monitoring systems where a vehicle may be allowed to move unless a signal (restricting movement) is received.

The off-board controller in one example may include an off-board sensor 217 that may be utilized to verify the operation conditions determined by the on-board sensor. For example, if the on-board sensor detects that the air pressure in the braking system drops below a determined threshold value pressure, an indication of an operation condition poor brake performance may be determined by the one or more processors. To verify the operating condition, the controller communicates with the off-board sensor to take an auxiliary operating parameter of a temperature reading of the vehicle wheels as the vehicle system passes by the off-board sensor. The auxiliary operating parameter of the wheel temperatures may then be communicated back to the controller that can determine a cold wheel is provided. Specifically, if the temperature of a wheel in question is below a temperature threshold, verification may be provided that poor brake performance may be presented. In this manner, a diagnosis of poor brake performance may be determined by the one or more processors while the vehicle system is still on the route. As such, the diagnosis, along with suggested remedial actions can be communicated to the vehicle system operator, communicated to a remote maintenance controller, communicated to a remote depot controller, etc. By making a diagnosis using the controller and an off-board sensor along the route, scheduling, rearranging of timing, prescribing another inspection at a specific drive-thru inspector etc. can begin while the vehicle system is still on the route. As an additional example, an initial reading may be inconclusive, nearing a range of intolerance, or the like such that a follow up inspection to confirm or deny the condition may be presented. In yet another example, a first inspection station may not be equipped to make the type of inspection based on the diagnosis, as a result, the remedial action may be to skip or pass up a first inspection station in favor of a second inspection station that has the equipment and capabilities to provide a sufficient inspection. To this end, the information gathered for making the initial diagnosis, along with the diagnosis, reading that may be nearing a range of intolerance, initial reading, or the like, can also be passed along to an inspector to prevent the inspector of the vehicle system from overlooking the operating condition, thus eliminating human error.

In one example, the off-board sensor may be an off-board hot box detector. The off-board hot box detector may be positioned adjacent a route to determine a temperature related to an axle of the vehicle system. In this manner, if an on-board sensor may be a temperature sensor in a gearbox that detects and increase in temperature above a temperature threshold value, the controller can communicate with the off-board hot box detector to take temperature readings associated with the wheels. The off-board hot box detector may be an infrared sensor, temperature sensor, or the like. The off-board hot box detector may detect the temperature of a gear casing of an axle, the bearing temperature of an axle, a fluid temperature of lubricant of the axle, or the like. This detected temperature may then be communicated back to the controller that verifies a hot axle may be presented, and that maintenance may be required. Such verification may be determined utilizing an algorithm, mathematical model, mathematical function, lookup table, decision tree, or the like. In addition, depending on where on the route the vehicle system is at, the controller may provide recommendations related to reducing the speed of the vehicle system, or even stopping a vehicle system to prevent or reduce damage to an axle. In this manner, remedial measures may be communicated to the operator of the vehicle system that save time and costs.

In another example, the off-board sensor may be one of numerous off-board sensors at an inspection station along a route. The off-board sensor may communicate with an off-board controller at the inspection station that communicates with the on-board controller. The on-board controller may request a menu of services or off-board sensors available at the station for one or more inspections. Then, the on-board controller may reconcile the menu against known inspections, operational parameters determined, or the like specific to the vehicle to prioritize the utilization of different off-board sensors at the station. Such prioritization may be based on, operational parameters in relation to an operating range, cost of inspections, availability of off-board sensors, bandwidth, timing, etc. Such determinations may be determined utilizing an algorithm, artificial intelligence algorithm, mathematical function, mathematical model, look-up table, decision tree, or the like.

In yet another example, the off-board controller may be a remote controller such as a maintenance controller. In another example, a first off-board controller may include an off-board sensor, while a second off-board controller receives communication from the controller or first off-board controller related to an operating system, operating condition, maintenance, etc. The off-board controller may include one or more processors 218 for making determinations and a memory 220 with historical data related to the vehicle system, similar vehicles, the route, the trip the vehicle system may be undertaking, or the like. In one example, the historical data may be historical temperature data, historical pressure data, trip plan data, or the like. In another example, the off-board controller may make determinations regarding the movement of the vehicle system, and communicate such determinations to the controller. Specifically, if a determination and verification is made that an operating condition may be present, the off-board controller may receive such information and schedule maintenance, begin rearranging schedules, etc.

The controller may also include the vehicle characterization element 222 and trip characterization element 224 as described in relation to FIG. 1. Each obtains and provides additional characteristics that may be utilized in making determinations, calculations, models, verification etc. related to operating conditions of the vehicle system.

Figure 3:
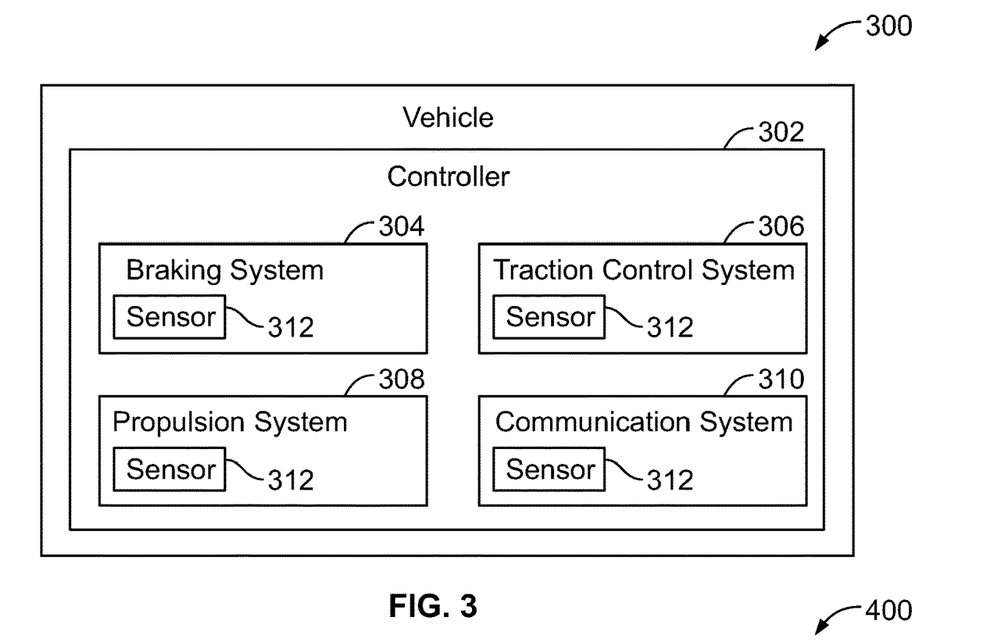
FIG. 3 illustrates block schematic diagram of a controller.

FIG. 3 illustrates a schematic diagram of operating systems within a vehicle system 300. In one example, the vehicle system may be the vehicle system of FIG. 1. The vehicle system includes a controller 302 that may control the operation of each of the operating systems. The controller in one example may be the controller of FIG. 2. The controller in this example may be coupled to a braking system 304, traction control system 306, propulsion system 308, and communication system 310. In other example embodiments other operating systems may be provided. Each of the operating system may include at least one on-board sensor 312 associated therewith. The on-board sensor may be on an operating system, in an operating system, adjacent an operating system, etc. The on-board sensor may be associated with the operating sensor if it detects first operating parameters associated with the operating system. In one embodiment, one operating system may not have an on-board sensor. In another example, an operating system may have two or more on-board sensors. For example, a braking system 304 may include an air pressure sensor, a force sensor that detects the force generated between brake pads, and a temperature sensor to detect excess heat caused by friction. Still, for each operating system, an on-board sensor may be provided to detect first operating parameters of the individual system.

Figure 4:
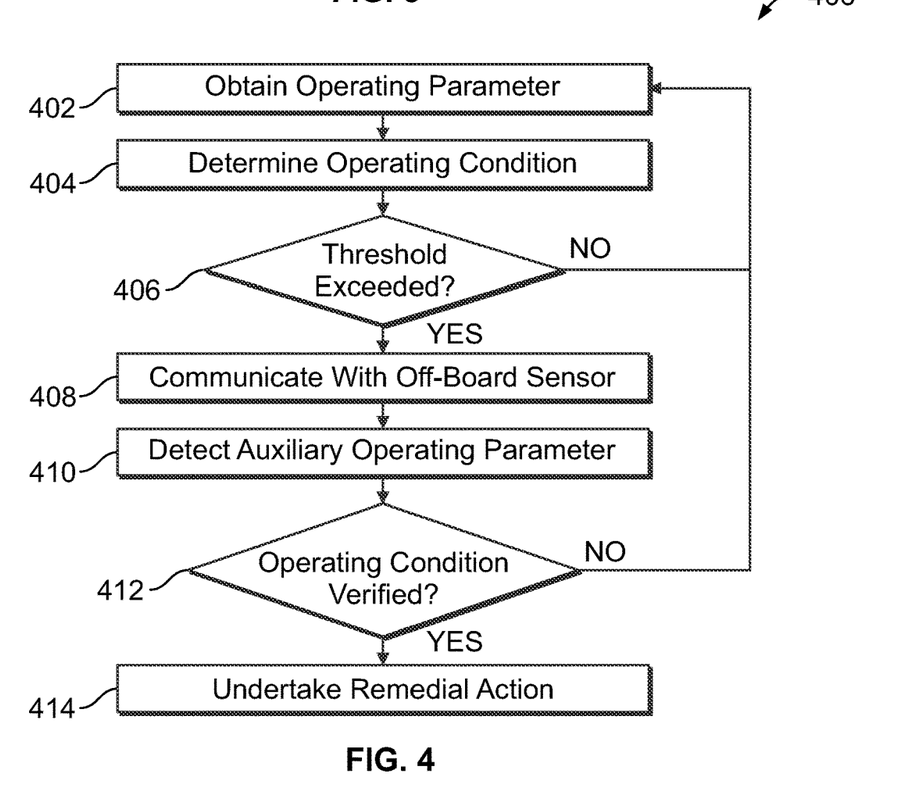
FIG. 4 illustrates a block schematic diagram of a method of controlling movement of a vehicle in an area.

FIG. 4 illustrates a block diagram of a method 400 of diagnosing an operating condition of a vehicle system. In one example, the controller, off-board controller, and/or sensor of FIG. 2 are utilized to implement the method.

At 402, the controller obtains at least one first operating parameter related to an operating system of the vehicle system. The controller may be on any of the vehicle systems described herein, including a rail vehicle system, marine vehicle system, marine vessel, aircraft, motor vehicle system, farm vehicle system, off-road vehicle system, etc. The first operating parameter may be a pressure, temperature, force, speed, velocity, acceleration, etc. The first operating parameter may be obtained by detecting the first operating parameter with a sensor associated with an operating system. The sensor may be a pressure sensor, temperature sensor, vibration sensor, speed sensor, angular speed sensor, level sensor, or the like. Alternatively, the first operating parameter may be obtained by making a determination using any of the operating parameters detected by a sensor. In yet another example, the first operating parameter may be calculated or determined utilizing data stored in memory of the vehicle controller, or another controller that communicates with the vehicle controller. Such data may include a trip plan, vehicle system characteristics, route characteristics, historical operating parameter data, historical vehicle system characteristics, historical route characteristics, or the like. In another example, the data and the first operating parameter detected by the sensor may be used to calculate or determine a second operating parameter. In one example, the first operating parameter may be the speed of the vehicle system. To determine the speed of the vehicle system, a speed sensor associated with the axle may be used, along with the grade of a route at a given point from a route characteristic in a trip plan, and predicted wind speed at the time based on historical wind data. As such, a speed of the vehicle system may be determined as the first operating parameter.

At 404, an operating condition of the operating system may be determined based on the at least one first operating parameter obtained. The operating condition may be any characteristic, force, or otherwise of an operating system. In one example, when the first operating parameter obtained is air pressure within a braking system, the obtained air pressure may be compared to historical data, calculated data, etc. of what the air pressure may be expected to be at any given time. The operating condition represents the difference or accuracy of the expected first operating parameter compared to the actual first operating parameter. In one embodiment, a determined threshold value may be provided to account for natural variances in operating parameters while a vehicle system is on a trip. Still, the first operating parameter exceeding a determined threshold value may be an indicator that an operating system may need maintenance, repair, is not operating efficiently, needs inspection, etc. So, the operating condition represents the comparison. Typically, the operating condition will be within the determined threshold value, and no additional analysis will be required. However, when the operating condition exceeds the determined threshold value additional analysis may be undertaken to verify that such maintenance, repair, inspection, etc. may be required. In this manner, a diagnosis may be made while the vehicle system is on the route.

When used herein, the term exceeds refers to a value that may be outside of a tolerance range. In particular, the term exceeds may be utilized to describe when a certain parameter may be both above or greater than a range, and less than or below a range. As an example, if temperature of a component may be provided as an operating parameter, the desired operating temperature may be between 5° C. and 50° C. (41°-122° F.). Therefore, a measured operating temperature of 4° C. would be considered to exceed the lower threshold value of 5° C., while a measured operating temperature of 51° C. would be considered to excess the upper threshold value. In this manner, to exceed a threshold, the measure does not have to be greater than a threshold, just outside of a range of operation. To this end, when a desired minimum air pressure is desired, if a measured pressure is less than the minimum air pressure, such a measured pressure has exceeded the minimum air pressure threshold. In addition, the ranges do not necessarily need to be one singular range. For example, an acceptable temperature range may be dependent upon the environmental temperature. In particular, when a vehicle is in an environment where the environmental temperature is less than 10° C., an operating parameter temperature range may be between 10° C.-30° C., while when the environmental temperature is more than 30° C., the operating parameter temperature range may be between 15° C.-40° C. In this manner, a 12° C. operating parameter temperature may exceed the 15° C.-40° C. range, but not the 10° C.-30° C. range based on the environmental temperature. In other example, multiple operational parameters may be utilized to determine if the same operating system has exceeded a range. For example, both temperature and pressure operational parameters associated with the brakes may be considered. The parameters may show that the brakes are within a pressure range, but outside of a temperature range. In such an instance, the pressure operating parameter does not exceed the pressure range; however, the temperature reading does exceed the temperature range.

At 406, a determination may be made whether the operating condition exceeds a determined threshold value. Specifically, if a determination is made that a determined threshold value may be exceeded, then the additional information may be desired to verify if the exceeded determined threshold value may be indicative of maintenance, repair, or the like. In one example, an expected operating condition may be determined, and the determined threshold value may be based on the expected operating condition. Specifically, in one embodiment, a trip plan may be utilized to calculate the expected level of oil within a gear casing. Specifically, based on the speed of the vehicle system, predicted wind speeds, stops, grade of route, etc. the expected level of oil at any one point during the trip may be determined if the axles are operating appropriately. Such determination may be a calculation, made from a mathematical model, from a look up table, etc. Such determination may be made before a trip begins, or may be made based on data obtained during the trip. Still, an expected first operating parameter may be calculated so that the first operating parameter may be compared to the expected first operating parameter. If the first operating parameter does not exceed the determined threshold value of the expected first operating parameter, operating parameters continue to be obtained, but no further action may be undertaken.

However, if the first operating parameter does exceed the determined threshold value, an operating condition may be presented and at 408, the controller communicates to an off-board sensor to detect at least one auxiliary operating parameter related to the operating system based on the operating condition. Specifically, along the route numerous off-board sensors may be placed to detect auxiliary operating parameters that may be used to determine if the operating condition may be indicative of the need for maintenance, repair, etc. The off-board sensor may be a wayside device, part of a wayside device, traffic monitor, video camera, a mobile sensor platform such as a drone, or robot, or the like. In one example, the off-board sensor may be a hot box detector positioned at the bottom of an incline. The off-board sensor may include a scanner, QR code reader, video camera or the like that may be utilized to identify the vehicle system. In this manner, when the off-board sensor communicates the auxiliary operating parameter to the controller, the off-board sensor may also communicate the auxiliary operating parameter to a remote device, such as a depot controller, maintenance controller, etc. and include the identification of the vehicle system so that actions can begin being undertaken if verification the operating condition may be provided by the off-board sensor.

At 410, the off-board sensor detects the auxiliary operating parameter based on the first operating parameter that has exceeded the determined threshold value. In one example, the auxiliary operating parameter may be the same as the first operating parameter. For example, the first operating parameter above the determined threshold value may be the temperature of an axle of the vehicle system. In particular, based on a grease temperature detection the temperature of the axle may be determined to be above a determined threshold value such as 50° C. Based on the exceeding of the axle temperature threshold value, the off-board sensor may be a hot box detector that detects the axle temperature of the wheel. In this manner, the first operating parameter may be the temperature of the axle, and the auxiliary parameter may be the axle temperature. Specifically, auxiliary may be referring to the parameter being measured by a different source or sensor. Alternatively, the first operating parameter and auxiliary parameter may be different measurements. As an example, the first operating parameter may be air pressure of the brakes. When the detected air pressure exceeds a determined threshold value, a hot box detector may be utilized to determine if cold wheels are presented. Such cold wheels indicate that the brakes are not operating properly. So, while the first operating parameter may be air pressure, the auxiliary parameter may be wheel temperature. Still, the auxiliary parameter may be related to the air pressure because the cold wheel may be a result of the air pressure exceeding the determined threshold value.

At 412, a determination may be made whether the first operating parameter exceeding the determined threshold value may be verified by that auxiliary parameter. If the auxiliary parameter does not verify the first operating parameter has an exceeded determined threshold value, then the one or more processors continue to obtain the first operating parameter. In one example, in response to not verifying the operating condition a remedial action or communication related to the operating condition are cancelled. In particular, a controller may operate to send a communication or provide a remedial action if no auxiliary parameter can be received from an off-board device in a determined period, such as ten seconds. Specifically, in certain areas, an off-board device may not be present for verification before reaching a determined location. As such, the communication or remedial action are provided if the determined period may be reached without obtaining the auxiliary parameter. However, if the auxiliary parameter can be obtained and does not verify the operating condition, such remedial action, or communication may be cancelled to prevent unneeded measurers from being undertaken, saving time and frustrations.

Alternatively, if the auxiliary parameter verifies the first operating parameter has exceeded the determined threshold value, then at 414, a remedial action may be undertaken. In one example, after detecting the auxiliary parameter, a lookup table, mathematical function, mathematical model, decision tree, or the like may be used to determine if the auxiliary parameter verifies the first operating parameter exceeds the determined threshold value. Specifically, the auxiliary parameter may exceed the determined threshold value, show a change in a parameter, etc. that verifies that an operating system may be in the need for inspection, maintenance, repair, shutting down, or the like. In one example, the remedial action may be communicating to the operator of the vehicle system the need for the inspection maintenance, repair, or the like. In addition, the communication may include instructions on how to operate the vehicle system before reaching a destination, including reduction in speed, stopping the vehicle system, use of an emergency systems, or the like. Alternatively, the remedial action may include the controller automatically operating the vehicle system to reduce speed, stop, etc. In another example, the remedial action may be the controller automatically communicating with a remote controller such as a depot controller, maintenance controller, etc. the operating condition, auxiliary parameter, vehicle system identification, vehicle system trip plan, etc. so that additional steps can be undertaken to address the operating system while the vehicle system is still on the route. In another example, the off-board controller communicates the information. In each instance, steps are undertaken before the vehicle system even reaches a destination to speed repair, maintenance, etc. In addition, such information can be provided to inspectors so that they know when an issue has been detected to prevent oversight of an operating condition that needs maintenance, repair, etc.

In one or more embodiments, a control system is provided that may include a controller for a vehicle system. The controller may include one or more processors configured to obtain at least one first operating parameter related to an operating system of the vehicle system, and determine an operating condition of the operating system based at least in part on the first operating parameter. The one or more processors may also be configured to communicate with an off-board sensor to obtain at least one auxiliary operating parameter related to the operating condition, and verify the operating condition based at least in part on the auxiliary operating parameter.

Optionally, the control system may also include an on-board sensor in communication with the controller, and the first operating parameter may be obtained by the controller from the on-board sensor. In one aspect, the operating parameter may comprise data from a trip plan. In another aspect, the controller may also be configured to calculate an expected operating parameter from data from a trip plan, and compare the expected operating parameter to the first operating parameter to determine whether the first operating parameter exceeds a determined threshold value related to the expected operating parameter. In one example, the operating parameter may be related to an air pressure within a braking system and the expected operating parameter may be an expected air pressure within the braking system.

Optionally, the controller may also be configured to communicate a remedial action to an operator of the vehicle system related to the operating condition, or communicate with an off-board controller at a remote location based on the operating condition, or communicate both with an operator and an off-board controller. In one aspect, the off-board sensor may be at least one of an optical sensor, a thermal sensor, or a vibration sensor. In another aspect, the operating parameter may be related to air pressure of a braking system and the at least one auxiliary parameter may be related to a temperature of at least one axle of the vehicle system. In one example, the vehicle system may be a rail vehicle. In another example, the controller may also be configured to, in response to not verifying the operating condition, cancel a remedial action or communication related to the operating condition.

In one or more embodiment, a method is provided that may include obtaining, with a sensor, at least one first operating parameter related to an operating system of the vehicle. The method may also include comparing the at least one first operating parameter to an expected first operating parameter, and communicating to an off-board sensor to detect at least one auxiliary operating parameter related to the operating system in response to the at least one first operating parameter exceeding a determined threshold value related to the expected first operating parameter. The method may also include determining an operating condition related to the first operating parameter based on the auxiliary operating parameter.

Optionally, the method may also include determining the operating condition based on the at least one first operating parameter and the expected operating condition, and verifying the operating condition based on the at least one first operating parameter and the expected operating condition with the operating condition determined based on the auxiliary operating parameter. In one aspect, communicating to an off-board sensor to detect at least one auxiliary operating parameter may include sending a signal to an off-board device that includes an off-board sensor. In another aspect, the method may also include communicating a remedial action to an operator of the vehicle related to the operating condition, communicating with an off-board controller at a remote location based on the operating condition, or communicating both with an operator and an off-board controller. In one example, the method may also include calculating the expected first operating parameter from data from a trip plan. In another example, the first operating parameter may be related to an air pressure within a braking system and the expected operating may be an expected air pressure within the braking system.

In one or more embodiments, a control system is provided that may include a controller for a vehicle system. The controller may include one or more processors configured to obtain at least one first operating parameter related to an operating system of the vehicle system. The one or more processors may also be configured to communicate to an off-board sensor to detect at least one auxiliary operating parameter related to the operating system based on the at least one first operating parameter, and determine an operating condition based on the at least one auxiliary operating parameter. The one or more processors may also be configured to communicate with an off-board controller at a remote location based on the operating condition.

Optionally, the one or more processors may also be configured to determine a remedial action related to the operating condition, and communicate the remedial action to the off-board controller at the remote location. In one aspect, to determine the operating condition based on the at least one auxiliary operating parameter may include determining an expected first operating parameter, and comparing the expected first operating parameter to the auxiliary operating parameter. In another aspect, determining the expected first operating parameter may include calculating the expected first operating parameter based on data from a trip plan.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A control system comprising:
    a controller for a vehicle system having one or more processors configured to:
        obtain at least one first operating parameter related to an operating system of the vehicle system;
        compare the at least one first operating parameter to an expected first operating parameter;
        determine an operating condition of the operating system based at least in part on the first operating parameter;
        communicate with an off-board sensor to detect at least one auxiliary operating parameter related to the operating condition of the operating system in response to the at least one first operating parameter exceeding a determined threshold value related to the expected first operating parameter;
        verify the operating condition of the operating system by comparing the at least one first operating parameter with the at least one auxiliary operating parameter,
        wherein the controller is configured to control movement of the vehicle system responsive to verifying the operating condition of the operating system by changing one or more of a propulsion setting or a brake setting of the vehicle system.

2. The control system of claim 1, further comprising an on-board sensor in communication with the controller, and the first operating parameter is obtained by the controller from the on-board sensor.

3. The control system of claim 1, wherein the first operating parameter comprises data from a trip plan.

4. The control system of claim 1, wherein the controller is further configured to:
    calculate an expected operating parameter from data from a trip plan; and
    compare the expected operating parameter to the first operating parameter to determine whether the first operating parameter exceeds a determined threshold value related to the expected operating parameter.

5. The control system of claim 4, wherein the first operating parameter is related to an air pressure within a braking system and the expected operating parameter is an expected air pressure within the braking system.

6. The control system of claim 1, wherein the controller is further configured to one or more of:
    communicate a remedial action to an operator of the vehicle system related to the operating condition;
    communicate a request for an inspection to an off-board controller;
    communicate with an off-board controller at a remote location based on the operating condition; or
    communicate both with an operator and an off-board controller.

7. The control system of claim 1, wherein the off-board sensor is at least one of an optical sensor, a thermal sensor, or a vibration sensor.

8. The control system of claim 1, wherein the first operating parameter is related to air pressure of a braking system and the at least one auxiliary operating parameter is related to a temperature of at least one axle of the vehicle system.

9. The control system of claim 1, wherein the vehicle system is a rail vehicle.

10. The control system of claim 1, wherein, responsive to the controller not verifying the operating condition, the controller is further configured to cancel a remedial action or communication related to the operating condition.

11. A method comprising:
    obtaining, with a sensor, at least one first operating parameter related to an operating system of a vehicle;
    comparing the at least one first operating parameter to an expected first operating parameter;
    communicating to an off-board sensor to detect at least one auxiliary operating parameter related to the operating system of the vehicle in response to the at least one first operating parameter exceeding a determined threshold value related to the expected first operating parameter;
    determining an operating condition related to the first operating parameter based on the auxiliary operating parameter;
    verify the operating condition of the operating system by comparing the at least one first operating parameter with the at least one auxiliary operating parameter; and
    controlling movement of the vehicle responsive to verifying the operating condition of the operating system.

12. The method of claim 11, further comprising:
determining the operating condition based on the at least one first operating parameter and the expected first operating condition; and
verifying the operating condition based on the at least one first operating parameter and the expected first operating condition with the operating condition determined based on the auxiliary operating parameter.

13. The method of claim 11, wherein communicating to an off-board sensor to detect at least one auxiliary operating parameter includes sending a signal to an off-board device that includes an off-board sensor.

14. The method of claim 11, further comprising:
communicating a remedial action to an operator of the vehicle related to the operating condition; or
communicating with an off-board controller at a remote location based on the operating condition; or
communicating both with an operator and an off-board controller.

15. The method of claim 11, further comprising: calculating the expected first operating parameter from data from a trip plan.

16. The method of claim 11, wherein the first operating parameter is related to an air pressure within a braking system and the expected operating is an expected air pressure within the braking system.

17. A control system comprising:
a controller for a vehicle system having one or more processors configured to:
obtain at least one first operating parameter related to an operating system of the vehicle system;
compare the at least one first operating parameter to an expected first operating parameter;
communicate to an off-board sensor to detect at least one auxiliary operating parameter related to the operating system based on the at least one first operating parameter responsive to determining that the at least one first operating parameter exceeds a determined threshold value related to the expected first operating parameter;
determine an operating condition of the operating system based on the at least one auxiliary operating parameter; and
verify the operating condition of the operating system by comparing the at least one first operating parameter with the at least one auxiliary operating parameter;
wherein the controller is configured to change one or more operating settings of the vehicle system to control movement of the vehicle system responsive to verifying the operating condition of the operating system.

18. The control system of claim 17, the one or more processors further configured to:
determine a remedial action related to the operating condition; and
communicate the remedial action to an off-board controller at a remote location.

19. The control system of claim 17, wherein the controller is configured to determine the expected first operating parameter based at least in part data from a trip plan.

20. The control system of claim 17, wherein the at least one first operating parameter is related to an air pressure within a braking system, and the expected first operating parameter is an expected air pressure within the braking system.

* * * * *